Patented Nov. 11, 1930

1,781,492

UNITED STATES PATENT OFFICE

WILLIS A. BOUGHTON, OF CAMBRIDGE, MASSACHUSETTS

MANUFACTURE OF RUBBER

No Drawing.   Application filed July 28, 1923. Serial No. 654,465.

This invention relates to improvements in the manufacture of rubber. More especially it relates to the use of chemical processes in connection with rubber in emulsified form, as in latex, in obtaining vulcanized rubber.

The invention provides for rubber to be taken directly from latex, in association with sulfur, or with selenium or tellurium, in such form that the associated substances are ready to be vulcanized by heat or otherwise without the customary preliminary separation and solidification of rubber and subsequent treatment of it in solid form.

It is among the results of the invention to provide for the permeation of sheets of cloth, paper, fibers, pulp, etc., and the ready vulcanizing of rubber within and on such sheets. Also the rubber may be produced in film form, and in thicker masses.

These ends are attained by mixing a liquid containing sulfur in solution, or sulfur in loose combination in solution, with a liquid, as latex, containing rubber in mobile colloidal dispersion in such manner that upon drying, after any reaction that occurs, or upon precipitation, the rubber and sulfur are left in such intimate and evenly distributed association that the vulcanization can be effected by merely heating them. This intimate association may be purely physical, as appears to be the fact in one case, or there may be a chemical combination, as appears to be the fact in another case. It is an underlying principle that the sulfur should be provided in a solution which will mix well with latex, the sulfur being either free or in such chemical combination that is released by reaction which does not injure the latex or rubber.

To this end I have found that an aqueous ammonia solution of sulfur, or of surfur compound, mixes well with ammoniacal latex. Upon such mixture being made, a chemical reaction occurs, or a physical change, or both, producing a liquid which when allowed to evaporate in sheet form leaves a residue of film which is tough and elastic, although somewhat discolored and odorous. This appears to be a partially vulcanized state which has been effected without heat; and this residue, when heated to the usual vulcanization temperature acquires the physical characteristics of vulcanized rubber.

The solution or compound may however be produced by adding the sulfur in a combined form more directly to latex, as by adding hydrogen sulfide gas or aqueous solution thereto, upon which the gas is absorbed by and reacts with the liquid, with the same result as above described.

The invention may be practiced in other modifications as by use of compounds or solutions of tellurium and of selenium in place of sulfur; and as by use of sodium sulfide or other water-soluble sulfides or water-soluble alkalies to make a solution of sulfur.

As an illustrative example, the process first above mentioned will be described.

A solution of ammonium hydro-sulfide having been prepared by passing hydrogen sulfide into a solution of ammonia in water, sulfur is introduced into the solution by adding free sulfur and heating. The colorless solution becomes yellow, reddish, then deep red, as more and more sulfur dissolves, making a solution of ammonium polysulfide. The combination by which the added sulfur is held is undoubtedly a loose one, one evidence of which is that upon spontaneous evaporation of the solution free sulfur is deposited. This solution, containing dissolved ammonia, as also does commercial latex, mixes well with latex; but the mixture becomes darker than either constituent, turning a bluish clay-grey color, depending upon the amount of sulfur carried by the polysulfide solution, the change of color being such as signifies a chemical action or physical change or both. It appears that this is, to a degree, a vulcanization of the colloidal gum particles of rubber while still suspended in the fluid mixture. When the resulting liquid is allowed to evaporate in sheet form a blue-green transparent film is produced which when heated to the usual vulcanization temperature loses the characteristic offensive odor of soluble sulfide and becomes a tough, elastic film having the brownish color and the physical characteristics of vulcanized rubber.

Without going through the course above described the result may be attained by adding hydrogen sulfide gas directly to the latex. At first no effect is apparent. But after a few minutes the solution begins to darken, eventually becoming a dark slate blue with milky appearance, indicating reaction or physical change. During the process the added gas becomes absorbed by the latex liquid. When absorption ceases the reaction appears to be at an end. The solution being then allowed to dry darkens from its dark slate blue color to a blue-green black film which when heated loses any offensive odor which it possesses and becomes strong, tough and elastic, possessed of the qualities of a well vulcanized pure rubber.

The above described chemical solution of sulfur compounds in latex may be applied to cloth, paper, fibers, paper-pulp and the like; and when then heated the rubber becomes vulcanized in the fiber, or is vulcanized carrying the fiber as a loading material. It appears indeed that the treated latex may be manipulated mechanically in any way that untreated latex can be used.

For the application of the invention with the salts of tellurium and selenium it is not necessary to use the poisonous hydrides. I have found, what has apparently been unknown heretofore, that ground elemental selenium dissolves readily in an aqueous solution of ammonium hydrosulfide to produce a cherry red solution which can be mixed with latex without causing the gum to coagulate. This mixture, when dry, produces a film which has the toughness, elasticity and other properties of a vulcanized gum. The mixture changes color, becoming pink, and the drying sheet becomes eosine-red; and the sheet when dried is red. Powdered tellurium dissolves only slowly in ammonia hydrosulfide and produces a bluish-grey solution. When this is mixed with latex the color undergoes no obvious change, except a slight darkening; but the film forms a mixture, which when dried and heated is markedly vulcanized. Both in this case and in the case of the selenium, however, the reaction continues slowly in the mixture, when the latter is allowed to stand, so that eventually a color results resembling that of the latex treated with hydrogen sulfide and indicating that the change which occurs is of the same nature as that with sulfur but slower. This is a matter of importance in view of the search that has been made for larger commercial uses for these substances which hitherto have been considered chiefly by-products.

In view of the above showing of the equivalence of selenium and tellurium to sulfur, in their behavior with rubber in mixtures and reactions, the term "sulfur" will be used in the claims hereof with the sense that the substitution of these other members of the sulfur family or their compounds for sulfur or compound of sulfur would be substantially an equivalent within the meaning of the patent law.

The sulfur in the mixture prepared for vulcanization may not be free sulfur but may be combined in some compound, the precise nature of which it is not necessary to know, in which it is so loosely held that upon being heated it is released, and the characteristic incidents and effects of vulcanization occur. As this, whether free or as a compound, is a solution; and as the colloidal rubber in latex is mobile in what may for practical purposes be called a colloidal solution; both rubber and sulfur are in fluid form, or at least are mobile in a way that is equivalent to fluidity and for which I somewhat arbitrarily for brevity herein use the term "fluid". It might be considered that both are dissolved in a liquid vehicle; but, whatever the precise physical or chemical form may be, the practical situation is that the one becomes dispersed throughout the other. If perchance there is a tendency of the liquids to separate, that tendency preferably should be combatted by stirring or other methods. The application of heat for evaporating the excess liquid might serve to maintain such a mixture during the evaporation; but if the rubber and sulfur are to be obtained in the above described solid stage preliminary to vulcanization, care should be taken to see that too much heat is not thus applied, lest the vulcanization be premature. Upon the drying, the colloidal rubber becomes a solid or semi-solid gel with the sulfur or sulfur compound distributed all through it in extremely intimate contact; and the two are in equally intimate contact with any foreign material, such as a sheet of cloth which it may be desired to rubberize, or with any other fabric or fibrous material which may have been laid in the bottom of the container; or with any filling or loading material which may have been maintained well distributed throughout the liquid. Owing to the uniform impregnation of such material by the liquid form of the sulfur and rubber a very perfect product is assured.

Considering the process as a whole it will be observed that it deals with reagents which on the one hand are vulcanizing materials such as sulfur, selenium or tellurium, and on the other hand are solutions of gases in water such as ammonia and hydrogen sulfide, that act as carriers for the vulcanizing materials and which may be eliminated by simple volatilization. The ammonia is ordinarily found in commercial latex, having been introduced when the latex is collected and serving to preserve the emulsion and prevent fermentation. While a solution of a sulfide or hydroxide, or both, of any alkali metal might be added in reasonable quantity to natural latex without precipitating the gum, it is to be considered that for the purposes of the present described process a hydroxide other than ammonia would remain as a harmful impurity in the precipitated gum, requiring elimination by a more complicated process of careful washing, whereas the ammonia may be eliminated by simple volatilization from solution. The ammonia should be present in latex in sufficient quantity to prevent any marked undesirable change in the physical or chemical properties of the latex that might otherwise be caused by the addition of an alkaline solution in the process. However, as the latex is itself alkaline the ammonia may in some cases be omitted, and the latex be treated in its natural form with hydrogen sulfide or other reagent for thereby the step of formation of ammonium sulfide is saved.

It is intended that the patent shall cover, by suitable expression in the appended claims, whatever features of patentable novelty exist in the invention disclosed.

I claim as my invention:

1. In the art of vulcanization, the steps of passing gaseous hydrogen sulphide, until absorption lessens substantially, directly into a continuous body of uniformly ammoniacal liquid latex; evaporating the resulting mass to convert it to solid state, thereby effecting partial vulcanization; and subjecting the residuum to the action of heat, whereby complete vulcanization is accomplished.

2. In the art of vulcanization, the steps of passing the gaseous hydride of an element of the sulphur group the atomic weight of which is at least as high as that of sulphur, until substantial saturation is attained, directly into a continuous body of uniformly ammoniacal liquid latex; evaporating the resulting mass to convert it to solid state, thereby effecting partial vulcanization; and subjecting the residuum to the action of heat, whereby complete vulcanization is accomplished.

3. In the art of vulcanization, the treatment of latex with the hydride of an element of the sulphur group the atomic weight of which is not less than that of sulphur which consists in passing said hydride, in the form of a gas and in excess of the amount required to react with the ammonia, into a continuous body of ammoniacal liquid latex.

4. In the art of vulcanizing, the step of passing into an ammoniacal suspension of rubber a gas comprising the hydride of an element of the sulphur family the atomic weight of which is at least as great as that of sulphur, said gas being in excess of the amount required to react with the ammonia.

5. In the art of vulcanizing, a process which includes the step of interacting rubber in a dispersed state and a hydride of an element of the sulphur group having an atomic weight not less than that of sulphur, the step of interacting being one which can be effected in an alkaline vehicle.

6. In the art of making vulcanized rubber, the steps of introducing an excess of hydrogen sulphide gas into a continuous body of liquid latex in which ammonium is present, drying the liquid, and heating the residue to produce the vulcanized rubber.

Signed at Readfield, Maine, this 23rd day of July, 1923.

WILLIS A. BOUGHTON.